United States Patent [19]

Merkle

[11] Patent Number: 4,518,154

[45] Date of Patent: May 21, 1985

[54] PNEUMATIC SPRING, ESPECIALLY FOR MOTOR VEHICLES

[75] Inventor: Josef Merkle, Esslingen, Fed. Rep. of Germany

[73] Assignee: Daimler-Benz Aktiengesellschaft, Fed. Rep. of Germany

[21] Appl. No.: 68,578

[22] Filed: Aug. 22, 1979

[30] Foreign Application Priority Data

Aug. 22, 1978 [DE] Fed. Rep. of Germany ....... 2836662

[51] Int. Cl.³ .............................................. F16F 13/00
[52] U.S. Cl. ...................................... 267/34; 267/8 R; 267/64.24; 267/64.27; 267/151; 280/712
[58] Field of Search ...................... 267/69, 72, 74, 122, 267/121, DIG. 1, 151, 8 R, 34, 35, 64.27, 64.21, 64.24; 280/711, 712

[56] References Cited

U.S. PATENT DOCUMENTS

| 1,328,496 | 1/1920 | Cox .................................... 267/65 A |
| 2,846,983 | 8/1958 | Otto .................................... 267/122 |
| 2,933,308 | 4/1960 | McGavern, Jr. et al. ..... 267/65 B X |
| 2,973,968 | 3/1961 | Behles .............................. 280/711 X |
| 3,014,714 | 12/1961 | Trevoskis ........................ 280/711 X |
| 3,046,000 | 7/1962 | Polhemus et al. ................. 267/64 B |
| 3,145,985 | 8/1964 | De Carbon ....................... 267/64 B |
| 3,369,625 | 2/1968 | Sampietro .......................... 267/34 X |

FOREIGN PATENT DOCUMENTS

| 446516 | 7/1927 | Fed. Rep. of Germany .... 267/65 B |
| 1130307 | 5/1962 | Fed. Rep. of Germany ...... 280/711 |
| 785195 | 10/1957 | United Kingdom ............. 267/65 A |
| 2008715 | 6/1979 | United Kingdom ............. 267/65 A |

Primary Examiner—George E. A. Halvosa
Attorney, Agent, or Firm—Craig & Burns

[57] ABSTRACT

A pneumatic spring for motor vehicles which includes a closed spring volume and two spring surfaces of different sizes adapted to be subjected to pressure acting in opposite directions. The two spring surfaces each have an effective spring surface which is variable in size as a function of travel of the pneumatic spring. A separate support arrangement is provided for each of the spring surfaces for supporting the spring surfaces so as to be coaxial with respect to one another. A linking construction is provided for elastically linking the two support arrangements with one another so as to enable an axial distance between the support arrangements to be variable within predetermined limits as a function of a pressure of the closed spring volume.

15 Claims, 5 Drawing Figures

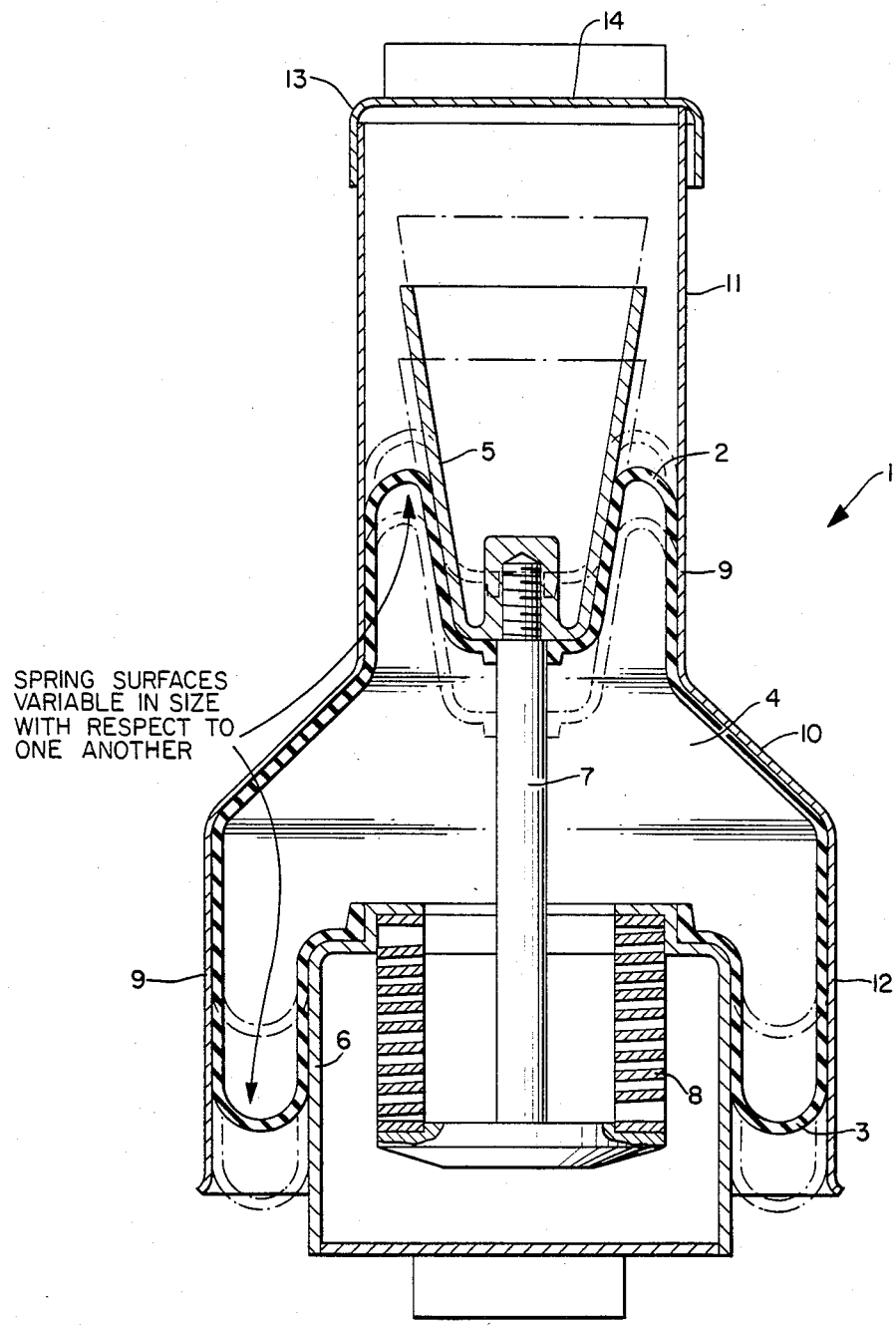

COMPRESSION

PNEUMATIC SPRING, ESPECIALLY FOR MOTOR VEHICLES

The present invention relates to a pneumatic or air spring for motor vehicles which includes two supports, a closed spring volume, and two spring surfaces of different sizes, subjected to pressure in opposite directions with the spring surfaces being effective when facing away from one another and being variable in size with respect to one another as a function of the travel of the spring.

In a pneumatic or air spring of the aforementioned type, the spring surfaces are supported coaxially with respect to one another with the smaller spring surface decreasing over the spring travel distance whereby the spring volume is formed by two roll bellows delimiting a common chamber. The spring surfaces of the roll bellows facing away from one another are supported on spring pistons which are connected. The pistons have different diameters and at least the smaller of the spring pistons comprises a roll bellow support surface which decreases over the spring travel distance. The spring force is transmitted on the one hand by way of the spring pistons, and, on the other hand, by way of a support element associated with one of the roll bellows walls.

A pneumatic or air spring of the afomentioned type is proposed in, for example, commonly assigned co-pending U.S. application Ser. No. 959,800 now U.S. Pat. No. 4,200,270 issued Apr. 29, 1980, which includes two supports as well as at least one closed spring volume and two differently-sized spring areas which are subjected to a pressure acting in opposite directions. The two spring surfaces are separated from one another and are variable in size as a function of the travel of the pneumatic spring. Two roll bellows are arranged in a casing of the pneumatic spring with opposite spring surfaces of the bellows being supported upon connected spring pistons. The supports are formed, on the one hand, by the spring pistons, and, on the other hand, by a casing associated with the walls of the roll bellows. Partial volumes are defined by the roll bellows with the partial volumes being separated from one another so as to maintained the respective volumes essentially independent of the travel of the pneumatic spring. By virtue of such a construction, a soft spring system is provided with a zero delay response and yet a simple and sturdy spring construction is realized as a result of the smallest possible volume changes and correspondingly small dynamic hardening with the system hardening progressively toward two end positions of the spring.

In German Pat. No. 1,021,733, a pneumatic or air spring is proposed wherein two pleated bellows, which act against one another, are provided between which a support is arranged and a frame is disposed which forms an auxiliary air volume with the second support being associated with the frame. The two pleated bellows, at sides located away from the support, are connected to the frame as auxiliary air volumes so as to form a closed spring volume with the auxiliary air volume associated with the frame.

Disadvantages of the spring volume of the last-mentioned pneumatic or air spring construction resides in the fact that a corresponding dynamization of the entire auxiliary air volume during dynamic operation is produced, depending upon the volumes of the pleated bellows, whereby corresponding phase shifts and inertia is developed. Moreover, in such proposed construction, it is possible for the supporting capacity of the spring to be increased by increasing the filling pressure thereof; however, increasing the filling pressure, which applies to the entire system, necessarily always results in a quite specific spring characteristic.

The aim underlying the present invention resides in providing a pneumatic or air spring system of the aforementioned type which is capable of accepting stress variations with respect to its rated value, within certain load limits, essentially retaining its rated position.

In accordance with advantageous features of the present invention, the two spring pistons are tensioned elastically with respect to one another in such a manner that an axial spacing between the spring pistons is variable within limits as a function of a pressure in the spring chamber.

By virtue of the constructional features of the present invention, it is possible to realize changes in the effective spring surfaces as a function of the working pressure in the pneumatic spring element and, consequently, an increase or decrease in the effective spring surface of the larger supporting spring piston with respect to the effective spring surface of the smaller spring piston so that load variations will respect to a rated position can be absorbed essentially while retaining the rated position.

Consequently, the pneumatic spring in accordance with the present invention automatically operates to stabilize the level around the rated position with respect to certain load limits so that the preset rated position is largely maintained as is desirable with respect to static as well as quasi-static load variations. For example, this would be desirable with regard to movements around the roll axis when the vehicle is traversing curves as well as avoiding or reducing diving on brake application and squatting on acceleration of the motor vehicle.

Additionally, the spring construction of the present invention permits compensating for variations in level caused by static load variations and/or inclined positions of a body of the vehicle on slopping road surfaces up to a certain point. Advantageously, the spring system of the present invention can be used in conjunction with existing level-control systems for pneumatic suspensions since additional response limits can be provided for response of the additional external level control without resulting in undesirably large variations in the level of the motor vehicle.

Concerning the desired automatic level-stabilization within certain load limits about the rated position, advantageously, the roll bellows support surface of the small spring piston, which is usually designed to travel uniformly over the spring travel distance of the small spring piston is constructed in such a manner that there is a greater change in the effective spring surface of the small spring piston in an area of the displacement path of the small spring piston with respect to the large spring piston. More particularly, as the small spring piston moves further away from the large spring piston, the effective spring surface of the large spring piston is more markedly reduced and vice-versa.

In the pneumatic or air spring construction of the present invention, elastic tensioning of the spring pistons with respect to one another can be preferably accomplished by means of a tension spring element with the tension spring element being designed, in accordance with the present invention, to be an extension or compression spring. Advantageously, the tension spring element is arranged coaxially with respect to the spring piston.

Moreover, from the structural standpoint, it is specially advantageous in accordance with a further feature of the present invention, to dispose the tension spring element, fashioned as an extension or compression spring, centrally within the large spring piston.

The automatic level stabilization achieved in accordance with the present invention is theoretically independent of the frequency with regard to its operation which can lead to certain disadvantages with respect to the achievement of the highest possible riding comfort. In this respect, the construction in accordance with the present invention creates a definite spring hardening with respect to the high-frequency oscillation.

In order to combat the above-noted disadvantage, advantageously, in accordance with the present invention, a frequency-dependent method of operation for level stabilization according to the present invention is provided. In this regard, according to the present invention, a damping means is associated with the tension spring element. The damping means provides a damping action which ensures that the level regulation desired according to the present invention is fully effective under both static and quasi-static load variations while it does not function for high-frequency oscillations such as occur as a result of, for example, road impacts.

The advantageous damping of the tension spring element realized by the present invention may be structurally associated with the small or large spring piston whereby the small spring piston operates, for example, as a canceling means with an additional mass. In such reconstruction, fluid shock absorbers can be easily associated with the large spring piston.

The damping of the tension spring element in accordance with the present invention may be constructed as a fluid damping and the canceling mass may be integrated in the smaller spring piston.

Accordingly, it is an object of the present invention to provide a pneumatic spring which avoid, by simple means, shortcomings and disadvantages encountered in the prior art.

Another object of the present invention resides in providing a pneumatic spring which is capable of accepting stress variations within certain load limits.

Yet another obejct of the present invention resides in providing a pneumatic spring by which there are changes in the effective spring surfaces as a function of the working pressure in the pneumatic spring element.

A further object of the present invention resides in providing a pneumatic spring which achieves an automatic level stabilization within certain load limits.

A still further object of the present invention resides in providing a pneumatic spring which ensures a regulation of the level under both static and quasi-static load variations.

Another object of the present invention resides in providing a pneumatic spring which is simple in construction and therefore relatively inexpensive to manufacture.

These and other objects, features, and advantages of the present invention will become more apparent when taken in connection with the accompanying drawings, which show, for the purposes of illustration only, several embodiments in accordance with the present invention, and wherein:

FIG. 1 is a longitudinal cross-sectional view of a pneumatic spring in accordance with the present invention;

Figure 1A:
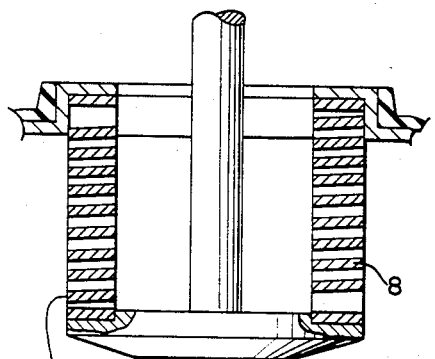
FIG. 1A shows an embodiment of the invention employing a spring in compression

Referring now to the drawings wherein like reference numerals are used throughout the various views to designate like parts and, more particularly, to FIG. 1, according to this figure, a pneumatic spring generally designated by the reference numeral 1 includes two roll bellows 2, 3 with the roll bellows 2 having a smaller effective spring surface than the roll bellows 3. The two roll bellows 2, 3 delimit a common chamber 4 which defines the spring volume. Each of the roll bellows 2, 3 is supported endwise on a cup-shaped spring piston 5, 6 with the bottom of the respective spring pistons 5, 6 being arranged against a respective roll bellows. The two cup-shaped spring pistons 5, 6 of the roll bellows 2, 3 are connected by a central tie rod 7. The tie rod 7 extends through the chamber 4 and is elastically supported by way of a tension spring 8 with respect to one of the spring pistons. In the embodiment illustrated in FIG. 1, the larger spring piston 6 forms the suspension spring piston.

The roll bellows 2, 3 are externally surrounded by a jacket generally designated by the reference numeral 9. The jacket includes a ring 10 in an area between the spring pistons 5, 6 with the ring 10 tapering toward the smaller of the effective spring surfaces or, in other words, toward the cup-shaped spring piston 5. The jacket 9 includes sleeves 11, 12 which bilaterally abut the conical ring 10. The sleeves 11, 12, along with the ring 10, are located concentrically with respect to the tie rod 7 thereby resulting in a totally rotationally symmetrical design for the pneumatic spring 1. In the embodiment of FIG. 1, the sleeves 11, 12 have an essentially cylindrical shape; however, the sleeves may assume other shapes such as, for example, a conical configuration.

Of the two spring pistons, in the embodiment shown in FIG. 1, the smaller spring piston 5 tapers toward the bottom while the large spring piston 6 has essentially a cylindrical jacket surface thereby resulting in a pneumatic spring having the basic construction and method of operation corresponding to those described in commonly assigned copending U.S. Application Ser. No. 959,599 filed Nov. 13, 1978.

In the construction of FIG. 1, the sleeve 11 of the jacket 9 is extended upwardly above the small spring piston 5 so as to form a bell-shaped protective hood 14 together with a corresponding cover 13. On the hood 13 one of the spring support points, especially the upper spring support point, can be provided as a component of the jacket 9. The lower spring support point is then advantageously associated with the lower spring piston 6 in a manner not shown in detail in the drawings.

Assuming that the tie or tension rod 7 of the pneumatic spring 1 is firmly connected with the upper and lower spring pistons 5, 6, respectively, only small volume changes will occur during spring movements in the pneumatic springs of the type described herein. This situation is achievable by an appropriate construction and/or guidance of the roll bellows loops so that such pneumatic springs have a correspondingly small dynamic hardening and permit soft, zero-delay response but with progressive hardening toward both spring end positions.

In addition to the basic function, in the construction of the present invention, the fact that the tie rod 7 is elastically supported flexibly within certain limits with respect to one of the spring pistons 5 or 6, an automatic level regulation is possible with regard to certain load variations about a rated position so that the rated position of the spring 1 can be essentially maintained despite certain load variations. This is accomplished by virtue of the fact that each compression of the spring initially causes a certain pressurizing in the system, in other words, increases the pressure in the chamber 4, with the result that the small spring piston 5 can upwardly with respect to the large lower spring piston 6, firmly attached to the lower support, as a function of the elasticity of the spring 8.

However, such a separating movement causes the effective spring surface of the smaller spring piston 5 to become smaller so that the difference between the effective spring surfaces of the lower and upper spring pistons 6, 5 and roll bellows 3, 2 increases so that a correspondingly larger supporting force is available. A higher load can be supported corresponding to the greater supporting force while essentially retaining the initial position which corresponds to the rated position.

The extension of the spring piston 5 relative to the spring piston 6 is limited by an elastic deformation path of the spring 8 which is used as a tensioning element, and is designed to match changes in the difference between the effective spring surfaces with regard to the desired automatic level regulation. The hardness of the spring 8, used as a tension spring element, simultaneously permits adjustment of the response characteristic whereby, in a normal case, the softest possible response characteristic is desirable, according to the present invention, in order to achieve considerable travel with minimum pressure differential, thereby ensuring the stablest possible level with respect to the rated position within certain load limits.

By contrast with the previously-described procedure, upon an extension of the pneumatic spring 1 and a corresponding reduction of pressure, the small spring piston 5 is pulled away from the large spring piston 6 with the result being that the difference between the effective surfaces decreases and the supporting force of the spring force decreases as well. Accordingly, the extension movement of the spring 1 is counteracted.

The pneumatic spring system of FIG. 1, from the standpoint of inertia of the compression spring 8, FIG. 1A, provided as the tensioning spring element is practically frequency-independent and corresponds to the proposed system described hereinabove and therefore responds unformly to both high frequency and low frequency spring movements. However, with regard to motor vehicles, such behavior can be undesirable especially from the comfort standpoint since it causes hardening of the springs even in response to the high frequency spring movements resulting in increased sensitivity to road impacts.

In order to counteract the undesirable behavior, a damping element may be associated with the spring 8 forming the tension spring element which damping element serves to damp the pressure-dependent movement of the spring pistons with respect to one another as a function of the frequency.

As especially simple solution for achieving the damping resides in providing the small spring piston with a relatively large mass which mass alone would suffice to provide a certain amount of dynamic daming. In the construction of FIG. 1, this can be further improved by making the bell-shaped protective hood 14 closed except for one or more throttle openings (not shown) so that the adjustment movements of the spring piston 5 are damped; however, other damping possibilities are provided in FIGS. 2-4 for a pneumatic spring which otherwise corresponds to that of FIG. 1.

Figure 2:
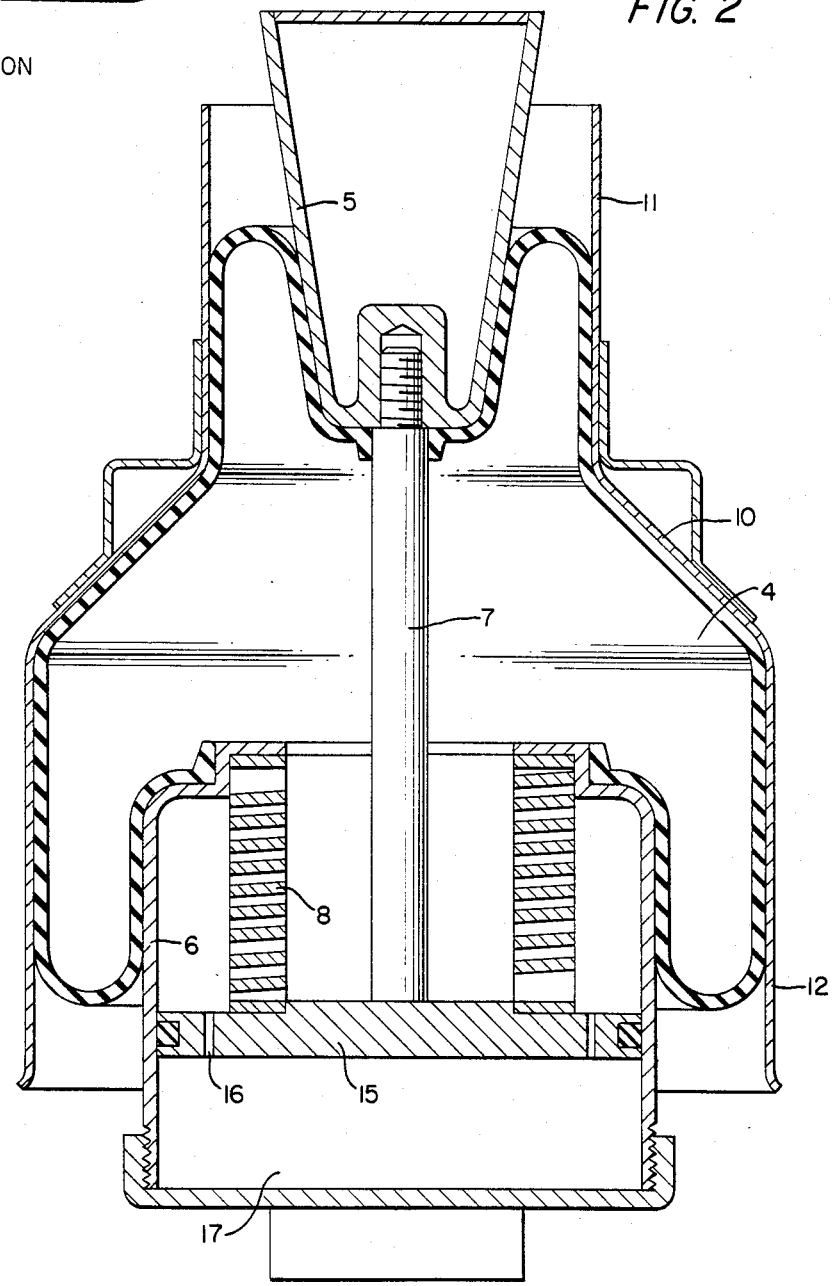
FIG. 2 is a longitudinal cross-sectional view of another embodiment of a pneumatic spring in accordance with the present invention with an additional damping device being provided.

As shown in FIG. 2, a pneumatic or gas damper may be provided for effecting damping of the tension spring element. For this purpose, a damping chamber communicates with the common chamber 4 forming part of the spring volume. More particularly, the construction is such that the spring piston 6 forms a guide surface for a piston 5 which is disposed within the jacket or confines of the spring piston 6. The piston 15 is connected with the tie rod 7 with the tension spring 8 abutting a surface of the piston 15. Throttle bores 15 are provided in the piston 15 so as to subdivide the damping chamber formed by the spring piston 6.

Sudden pressure increases in the chamber 4 by, for example, the influence of road impacts, create a silutation in which the spring piston 5, in response to the pressure increase produced by the damping piston 15, is initially pulled downward slightly to the point where a corresponding counter pressure develops in the much smaller lower damping chamber 17. On the whole, in this solution, in response to sudden pressure variations, the upper spring piston 5 essentially remains in place or is even displaced slightly downward. Both of these events would have a positive effect on the riding comfort of the vehicle since no spring hardening would occur such as would normally occur when the upper spring piston 5 is extended, in other words, when the support force increases.

With the piston 6 at rest, the spring characteristic as such is retained to a greater degree while pulling the upper spring piston 5 down even results in a certain softening of the pneumatic spring. Corresponding effects occur with a pressure drop in the common chamber 4, in other words, when the spring is extended. Therefore, even in the event of sudden impacts, the spring characteristic remains either constant or hardens somewhat if the upper spring piston 5 is slightly extended so that the extension movement is counteracted and a definite dynamic stabilization is achieved.

Figure 3:
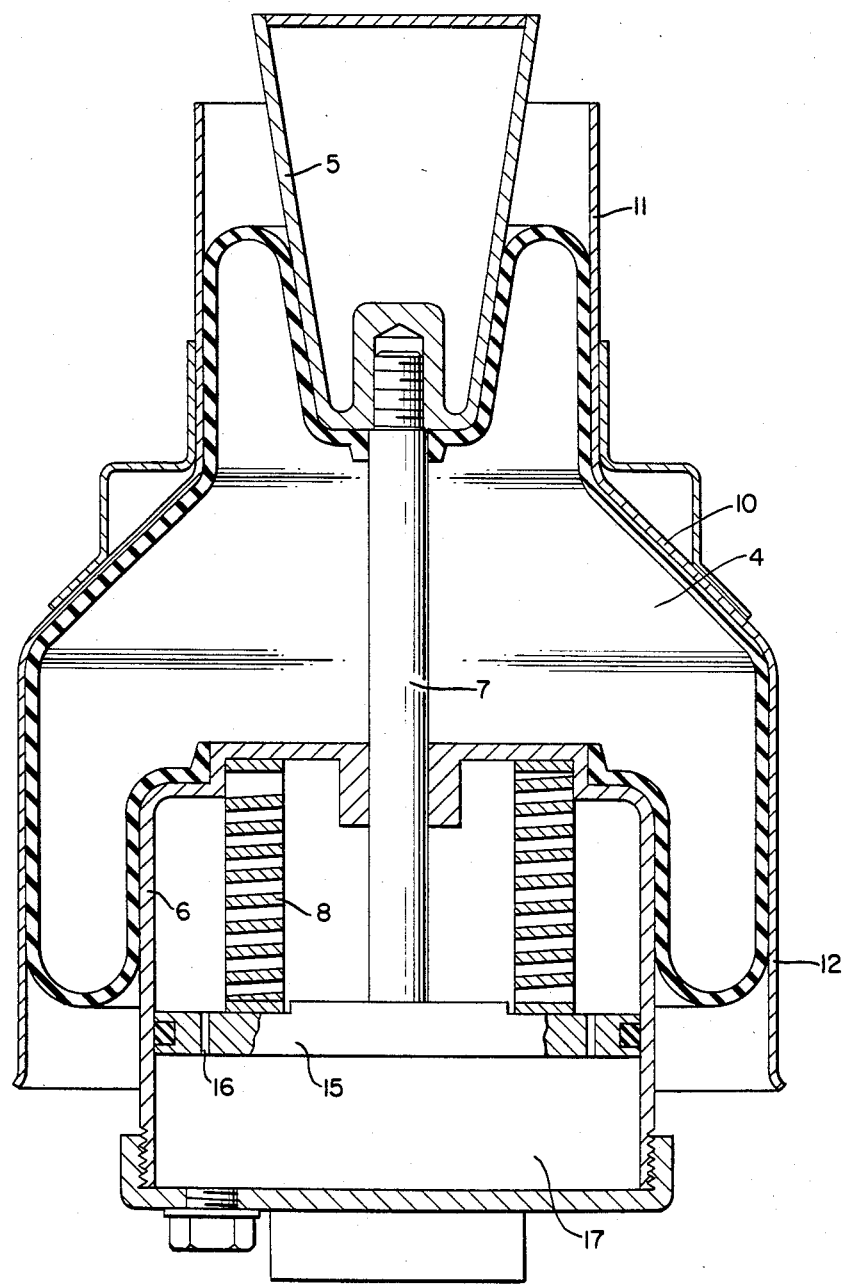
FIG. 3 is a longitudinal cross-sectionnal view of a further embodiment in accordance with the present invention with a modified damping arrangement.

In FIG. 3, a pneumatic or gas shock absorber is used which is separated from the common chamber 4 or spring volume proper and disposed, as an enclosed unit, in the spring piston 6. In the construction of FIG. 3, the tie rod 7 is connected to the damping piston 5. Additionally, throttle bores 16 are provided in the damping piston 15. The tension spring 8 abuts a surface of the damping piston 15 as well as abutting the spring piston 6 which forms a jacket for the damping piston 15. A filling opening is provided for enabling a filling of the enclosed lower damping chamber 17.

Advantageously, in a construction such as shown in FIG. 3, the tie rod 7 need not form a rigid connection between the upper spring piston 5 and the lower damper piston 15 but rather a certain degree of flexibility may be provided at right angles to the longitudinal axis which may be accomplished by, for example, making a part of the tie rod 7 of an element which can move at an angle.

Figure 4:
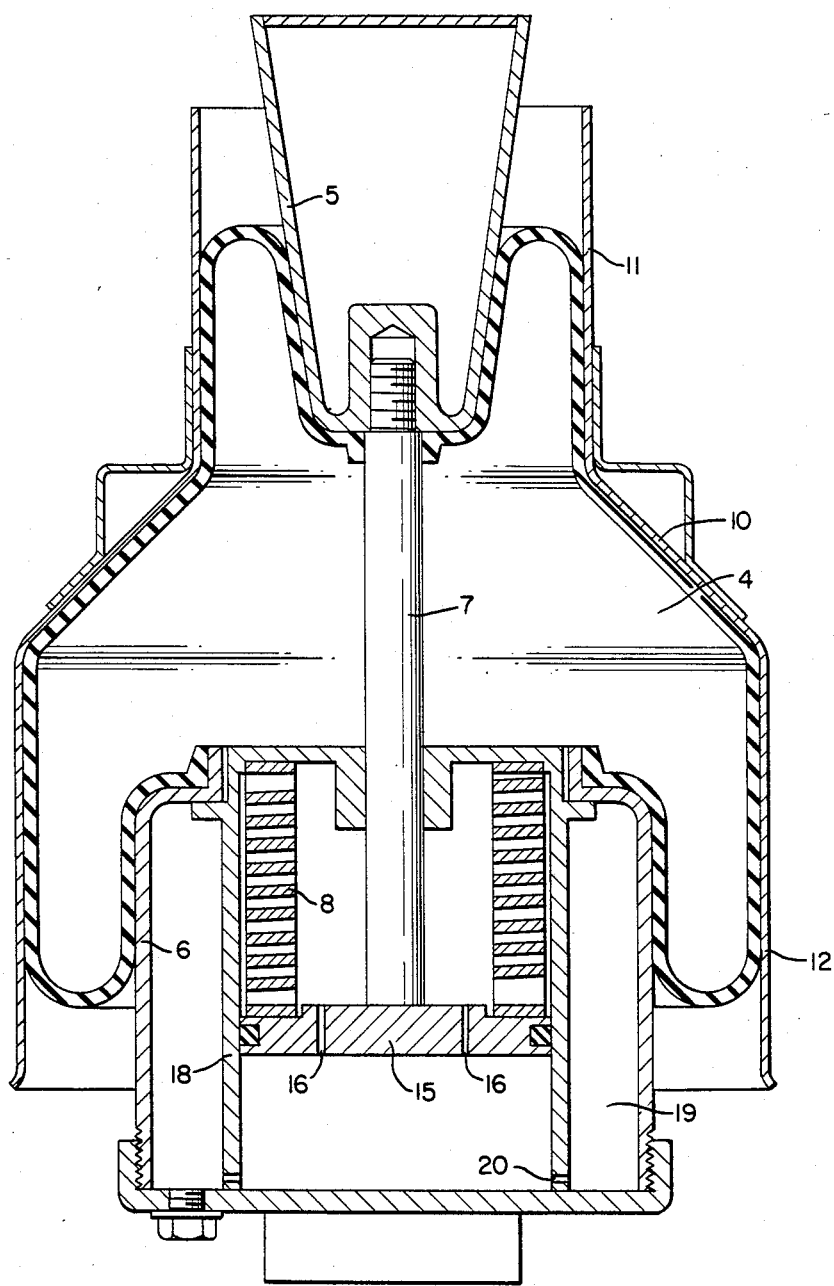
FIG. 4 is a longitudinal cross-sectional view of yet another embodiment in accordance with the present invention also employing a modified damping device.

In the construction of FIG. 4, a hydraulic damping is provided whereby the damping unit is again disposed in the spring piston 6 with the damping piston 15 once again being connected with the tie rod 7. The damping piston 15 is also provided with throttle openings 16. The tension spring 8 abuts at one end at the damping pistion 15. With respect to the necessary volume equalization for a hydraulic system with an imcompressible damping medium, the damping piston 15 is located inside an inner jacket 18 disposed within the spring piston 6. The inner jacket delimits an annular space 19 as an equalizing volume relative to the circumferential wall of the spring piston 6. Cross bores 20 which form throttle bores provide the necessary communication between the annular space 19 and the damping chamber. A hydraulic damping has the advantage over pneumatic damping of higher effectiveness, and, in particular, makes it possible to achieve even better damping at high frequencies, a possibility which may be of particular interest for engine mounts and the like.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A pneumatic spring for motor vehicles which includes at least one closed spring volume, two spring surfaces of different sizes adapted to be subjected to pressure acting in opposite directions, the two spring surfaces each having an effective spring surface which is variable in size as a function of travel of the pneumatic spring, and a separate supporting means for supporting the respective spring surfaces so as to be coaxial with respect to one another, characterized in that means are provided for elastically linking the respective supporting means with one another so as to enable an axial distance between the respective supporting means to be variable within predetermined limits as a function of a pressure of the closed spring volume, characterized in that a smaller of the two spring surfaces decreases over the travel distance of the pneumatic spring, two roll bellows means provided for forming the respective spring surfaces, said spring surfaces facing away from each other, each of the roll bellows means defining a partial volume of the at least one closed spring volume, the supporting means includes a pair of spring piston means having different diameters associated with the respective roll bellows means such that the effective spring surfaces of the roll bellows means facing away from each other are supported by the respective spring piston means, and in that at least the smaller of the spring piston means includes a support surface means for the roll bellows means which tapers over the travel distance of the pneumatic spring, and in that a spring force is transmitted by the spring piston means and a supporting element associated with walls of the roll bellows means.

2. A pneumatic spring according to claim 1, characterized in that the elastic linking means includes at least one tension spring means.

3. A pneumatic spring according to claim 2, characterized in that the at least one tension spring means is constructed as a compression spring.

4. A pneumatic spring according to claim 2, characterized in that the at least one tension spring means is constructed as a compression spring.

5. A pneumatic spring according to one of claims 4 or 3, characterized in that the tension spring means is disposed coaxially with respect to the spring piston means.

6. A pneumatic spring according to claim 5, characterized in that the tension spring means is disposed centrally inside of the spring piston means having the larger diameter.

7. A pneumatic spring according to claim 6, characterized in that damping means are associated with the tension spring means.

8. A pneumatic spring according to claim 7, characterized in that the damping means is disposed in the spring piston means having the larger diameter.

9. A pneumatic spring according to claim 8, characterized in that the damping means is constructed as a fluid damping means.

10. A pneumatic spring according to claim 7, characterized in that the damping means is associated with the spring piston means having the smaller diameter.

11. A pneumatic spring according to claim 10, characterized in that the damping means is constructed as a fluid damping means.

12. A pneumatic spring according to claim 7, characterized in that the damping means is constructed as a fluid damping means.

13. A pneumatic sprinng according to claim 7, characterized in that the damping means is formed by a canceling mass.

14. A pneumatic spring according to claim 13, characterized in that the canceling mass is associated with the spring piston means having the smaller diameter.

15. A pneumatic spring according to claim 14, characterized in that the canceling mass is integrally formed with the spring piston means having the smaller diameter.

* * * * *